United States Patent [19]

Stieger

[11] 4,173,058
[45] Nov. 6, 1979

[54] METHODS FOR MANUFACTURING PHOTOGRAPHIC FILM PROCESSING ROLLERS

[75] Inventor: Frank M. Stieger, Newton Highlands, Mass.

[73] Assignee: Polaroid Corporation, Cambridge, Mass.

[21] Appl. No.: 838,557

[22] Filed: Oct. 3, 1977

[51] Int. Cl.² ............................................. B21H 1/14
[52] U.S. Cl. .............................. 29/148.4 D; 29/132; 29/414; 29/527.4; 29/DIG. 47; 425/113
[58] Field of Search ................. 29/412, 413, 414, 417, 29/527.4, DIG. 47, 110, 132, 148.4 R, 148.4 D; 425/113; 72/46

[56] References Cited

U.S. PATENT DOCUMENTS

| | | | |
|---|---|---|---|
| 1,990,937 | 2/1935 | Forbes | 29/132 |
| 3,139,826 | 7/1964 | Rainwater | 29/DIG. 47 |
| 3,859,017 | 1/1975 | Meudec | 425/113 |
| 3,941,635 | 3/1976 | Tovelle et al. | 29/132 |
| 3,971,115 | 7/1976 | Schneide | 29/148.4 D |

FOREIGN PATENT DOCUMENTS 669464 1/1935 Fed. Rep. of Germany ..... 29/148.4 D

Primary Examiner—Leon Gilden
Attorney, Agent, or Firm—Francis J. Caufield

[57] ABSTRACT

In a method for manufacturing photographic film processing rollers useful in processing self-processable type film units, an adhesive priming composition is first applied to the surface of a cylindrical metal rod of given length. The rod is then pushed through a cross-head extrusion die to deposit a melted polymer comprising an elastomeric urethane resin on its surface to provide the rod's surface with a thin coating whose coefficient of friction is greater than that of the metal. The extruded coating is then hardened, and then the rod is cut into roller segments each having a predetermined length. Afterwards, each roller segment is centerless ground to provide it with journals at its opposite ends and to reduce the thickness of the polymeric coating intermediate the journals to provide a film-contacting traction coating of predetermined thickness and smoothness.

7 Claims, 5 Drawing Figures

METHODS FOR MANUFACTURING PHOTOGRAPHIC FILM PROCESSING ROLLERS

BACKGROUND OF THE INVENTION

1. Field of the Invention

This invention relates generally to the art of manufacturing film processing rollers of the type useful in processing self-processable type film units, and, more particularly, to methods for providing such rollers with a smooth film-contacting surface in the form of a thin, relatively high-friction, traction coating.

2. Background of the Prior Art

Fully automatic photographic systems for use with self-processable type films are well known in the photographic field and have been extensively described in the patent literature. These systems, such as Polaroid Corporation's "SX-70" and "Pronto!" cameras, are designed to automatically produce finished, waste-free photographs following their actuation. They accomplish this task through the use of specially designed interdependent function providing sub-systems which are organized to carry out a programmed series of sequential operations that ultimately result in a finished photographic print. The order of operations, following system activation, usually begins with exposure of a film unit at some suitable predetermined location within the camera. The exposed film unit then is advanced from the exposure location into engagement with a film processing sub-system or apparatus. The film processing apparatus functions to transport the exposed film unit to the exterior of the camera where it is accessible to the user and to spread a processing fluid across a selected photosensitive layer of the exposed film unit while the film unit is being transported to the exterior of the camera.

Film processing apparatus that have the capability of performing the foregoing functions are well known in the prior art and are extensively described in, for example, U.S. Pat. No. 3,776,118 issued to John J. Driscoll et al. on Dec. 4, 1973 and entitled "Photographic Film Processing Apparatus" and in U.S. Pat. No. 3,766,842 issued to James M. Whall on Oct. 23, 1973 and entitled "Photographic Film Processing Apparatus". Such film advancing-fluid spreading apparatus typically include a roller assembly comprising first and second rotatably mounted juxtaposed elongated rollers which are resiliently urged toward one another. A pair of annular collars are generally provided on the first roller to define a minimum gap between the rollers to facilitate the initial introduction of a leading edge of a film unit between the rollers. The first roller is adapted to be selectively driven by a motor of the camera and, when so driven, its anular collars impart a rotary motion to the second roller. At least those portions of the two rollers adapted to contact one another are formed of a relatively low friction, impact resistant material, such as stainless steel, while at least the sheet-contacting facing surface of the first roller is formed of a relatively high friction material such as urethane. The urethane coating operates to provide a relatively high traction force between the first roller and the film unit to transport the film unit outside of the camera and the stainless steel provides the strength necessary to withstand the pressures generated during the transport and fluid spreading phases. The stainless steel in addition to its strength also possesses desirable corrosion resistent characteristics.

Because of the nature of the functions of such film processing apparatus, the pressure-applying rollers which are used in them must be manufactured to extremely tight tolerances. For example, their outside diameters are typically held to a tolerance of within a few tenths of a mil. Obviously, this tolerance requirement adds to their overall expense. The urethane coated drive roller in particular represents a major portion of the total cost of such film processing apparatus not only because of the tolerance requirements but also because of the necessity of having the relatively high-friction urethane coating.

The present method of manufacturing such urethane coated drive rollers involves a batch processing electrostatic vapor spray technique. With the electrostatic spray technique, a group of finish-machined stainless steel top rollers are individually indexed to a spraying station where a layer of urethane is deposited on their exterior surfaces by spraying electrically charged vaporized urethane onto each roller's surface as the roller is rotated and electrically charged at a polarity opposite to that of the vaporized urethane. With this process, only one roller at a time can be coated with urethane at any one spray station. After the urethane coating has hardened, the roller is then finish ground to reduce the thickness of the urethane coating to a predetermined value. With this process, the cost of applying the urethane coating using the electrostatic spray technique is between 30% and 45% of the total cost of the roller.

While the electrostatic spray process produces functionally acceptable film processing rollers, it is obviously desirable to reduce the cost of manufacturing such rollers by using other methods.

One well-known method of applying plastic coatings, such as polyethylene and elastomeric vinyls, to wire is by cross-head extrusion. However, the materials involved in wire insulations are generally softer than those required for the traction coating of film processing drive rollers of the type previously described. Moreover, the tolerances on the thickness of wire insulation coatings are not as critical as those for film processing rollers.

It is also known that the cross-head extrusion process has been used to apply elastomeric coatings to handrails which are used in the transportation industry. These coatings, however, are generally relatively thick-on the order of one-eighth of one inch.

It is a primary object of the present invention to provide a high volume, low cost methods for manufacturing a photographic film processing roller.

It is another object of the present invention to provide methods for providing a relatively thin traction coating on a roller suitable for use in a photographic fluid processing and film transport apparatus.

Other objects of the invention will in part be obvious and will in part appear hereinafter. The invention accordingly comprises the methods possessing the sequence of steps, apparatus, and materials which are exemplified in the following detailed description.

SUMMARY OF THE INVENTION

The present invention relates generally to methods for manufacturing photographic film processing rollers of the type which are useful in film processing apparatus that are used to simultaneously transport and spread a fluid processing composition in a self-processable type film unit as the film unit is advanced to the exterior of a camera.

One disclosed method comprises the steps of extruding a melted polymer onto the surface of a cylindrical metal rod of given length and diameter to provide the surface of the rod with a thin polymeric coating whose coefficient of friction is greater than that of the metal. The coated rod is then subjected to a predetermined temperature to harden the polymeric coating. After the polymeric coating is hardened, the coated rod is cut into a plurality of segments each having a predetermined length. Finally, each rod segment is machined to provide it with journals at its opposite ends to facilitate its mounting for rotation within a film processing apparatus and to reduce the thickness of the traction coating intermediate the journals to provide a film-contacting traction coating of predetermined thickness and smoothness.

Another disclosed method comprises the steps of cutting a cylindrical metal rod of predetermined length into a plurality of segments each of given length. Journals are then machined at opposite ends of each rod segment. The rod segments are then connected together, end to end, by inserting their journals into couplings to form a continuous chain of segments. The continuous chain of rod segments is then pushed through an extrusion die to deposit a melted polymer on the surface of each roller segment to provide the segments' surface with a thin polymeric coating whose coefficient of friction is greater than that of the metal. Each segment is then subjected to a predetermined temperature to harden the coating. After the polymeric coating has hardened, each of the coated segments is separated by breaking the continuous chain at the couplings. Finally, the coating of each roller segment intermediate its journals is ground to provide a film-contacting traction coating of predetermined thickness and smoothness.

While either of the foregoing methods may be used successfully, it is preferred that they both include the additional step of applying an adhesive coating to the surface of the metal rod or rod segments prior to the step of extruding the melted polymer onto the metal's surface to promote bonding between the metal and the polymer.

The preferred adhesive composition comprises a dispersion of carbon black in an adhesive matrix comprising a first polymeric resin containing functional groups reactive with the metal and a second polymeric resin chemically similar to a polymeric constituent of the polymer.

While any number of polymeric coatings may be used in practicing the methods of the invention, the preferred polymer is a thermoplastic material comprising an elastomeric urethane resin which is preferably deposited on the surface of a rod comprising stainless steel.

Also in the methods disclosed, the thickness of the extruded coating is preferably no less than 9.0 mils and no greater than 10.0 mils and the thickness of the traction coating, after the machining step, is preferably no less than 5.0 mils and no greater than 7.0 mils.

DESCRIPTION OF THE DRAWINGS

The novel features that are considered characteristic of the invention are set forth with particularity in the appended claims. The preferred mode of practicing the invention, however, will best be understood from the following description of the illustrated methods when read in connection with the accompanying drawings wherein like numbers have been employed in the figures to denote the same parts and wherein:

DESCRIPTION OF THE INVENTION

Figure 1:
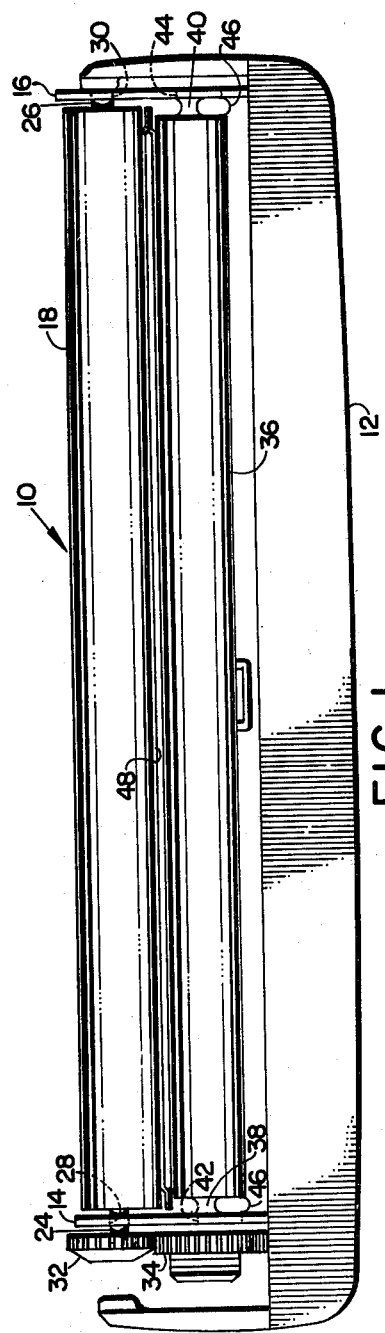
FIG. 1 is a front elevation view of a film processing assembly of the type in which a photographic processing roller manufactured according to the methods of the invention may be employed.

The present invention relates to methods for manufacturing photographic film-advancing and fluid-spreading rollers that are particularly suitable for use in a film processing apparatus such as that designated at 10 in FIG. 1.

Referring now to FIG. 1, the processing apparatus 10 is seen to comprise an elongated support member 12 having a pair of spaced apart vertically extending brackets, 14 and 16, positioned adjacent its opposite ends. Mounted between the brackets, 14 and 16, is an elongated top roller structure 18 of the type manufactured according to the methods of the present invention.

Figure 4:
FIG. 4 is a diagrammatic, partially cut-away, front elevation view of a photographic processing roller manufactured according to the methods of the invention.

As best seen in FIG. 4, the top roller structure 18 is a substantially cylindrical structure including a rigid cylindrical support member 20 which is preferably formed of a metal rod comprising stainless steel. Stainless steel is the preferred material for the support member 20 because of its strength characteristics and corrosion-resistant qualities. Overlying the support member 20 is a thin traction coating 22 preferably formed of an elastomeric polymer having a coefficient of friction at least two and one-half times greater than that of stainless steel.

At one end of the roller 18 is a journal 24 that extends through a complementary sized bearing hole 28 located in the bracket 14. Similarly, the other end of the roller 18 is provided with a journal 26 which extends through a corresponding complementary configured bearing hole 30 located in the bracket 16.

Affixed to the journal 24 is a spur gear 32 that is used to rotatably drive the top roller 18. The spur gear 32, in turn, is coupled to a pinion gear 34 that is powered in a well-known manner by a camera motor via a gear train neither of which are shown.

To illustrate the size and relative tolerances involved in manufacturing this type of roller structure, and, as well, to illustrate preferred characteristics of such rollers, one example of a commercially used roller will be given. In the film processing apparatus of Polaroid Corporation's Pronto! camera, the top roller, which is similar in structure to that of the roller 18, has the following dimensions. The thickness of the traction coating is between 5 and 7 mils. In addition, fluid spreading performance requires that the maximum variation in the thickness of the traction coating does not exceed $1.5 {}^{+\ 0.0}_{-\ 1.5}$ mils.

Also included in the processing apparatus 10 is an elongated cylindrical bottom roller 36 which is also preferably formed of stainless steel. Provided on the bottom roller 36 are a pair of journals, 38 and 40, located respectively at each of its opposite ends. The journals, 38 and 40, ride respectively in a pair of elongated slots 42 and 44, located in the brackets 14 and 16, respectively. This mounting arrangement for the bottom roller 36 permits it to simultaneously rotate and linearly displace with respect to the top roller 18.

Also provided in the processing apparatus 10 is a torsion spring 46 (only portions of which are shown) for continuously urging the bottom roller 36 towards the top roller 18.

The processing apparatus 10, thus constructed, comprises a pair of juxtaposed rotatable pressure applying rollers for receiving a self-processable type film unit, such as that designated at 48 in FIG. 1, to distribute a processing fluid lengthwise of the film unit 48 while simultaneously advancing the film unit 48 to the exterior of a camera. In order to perform these functions properly, it has been found that it is necessary to provide the drive roller, that is the top roller 18 in this case, with a high friction film-contacting surface so that the film unit 48 will not slip as it is being driven through the film processing assembly 10. It has also been found that it is essential that a strong uniform bond exist between the traction coating 22 and the cylindrical support member 20 so that no slippage occurs between these two elements. Moreover, the traction coating 22 must be smooth as previously indicated and preferably possesses certain elastomeric qualities which are specified in terms of its thickness and hardness. For example, the durometer of one preferred material for the traction coating 22 has a Shore Hardness value of 86.0±3.0 as measured on the "A" scale using the ASTM D2240 Test Method.

Figure 3:
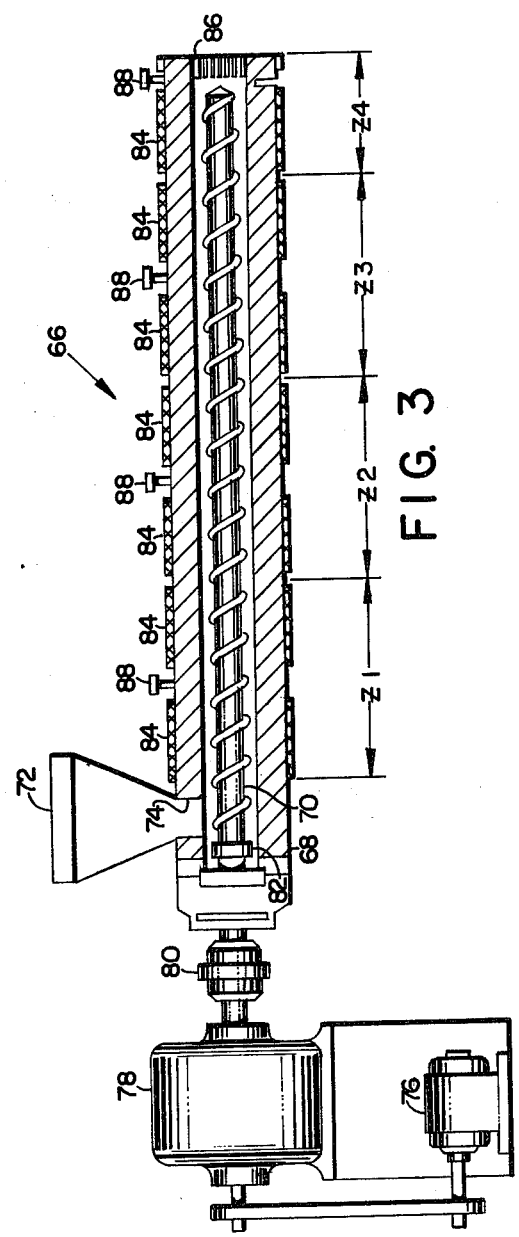
FIG. 3 is a schematic cross-section of a single screw extruder of the type which may be used in practicing a step of the invention.
Figure 2:
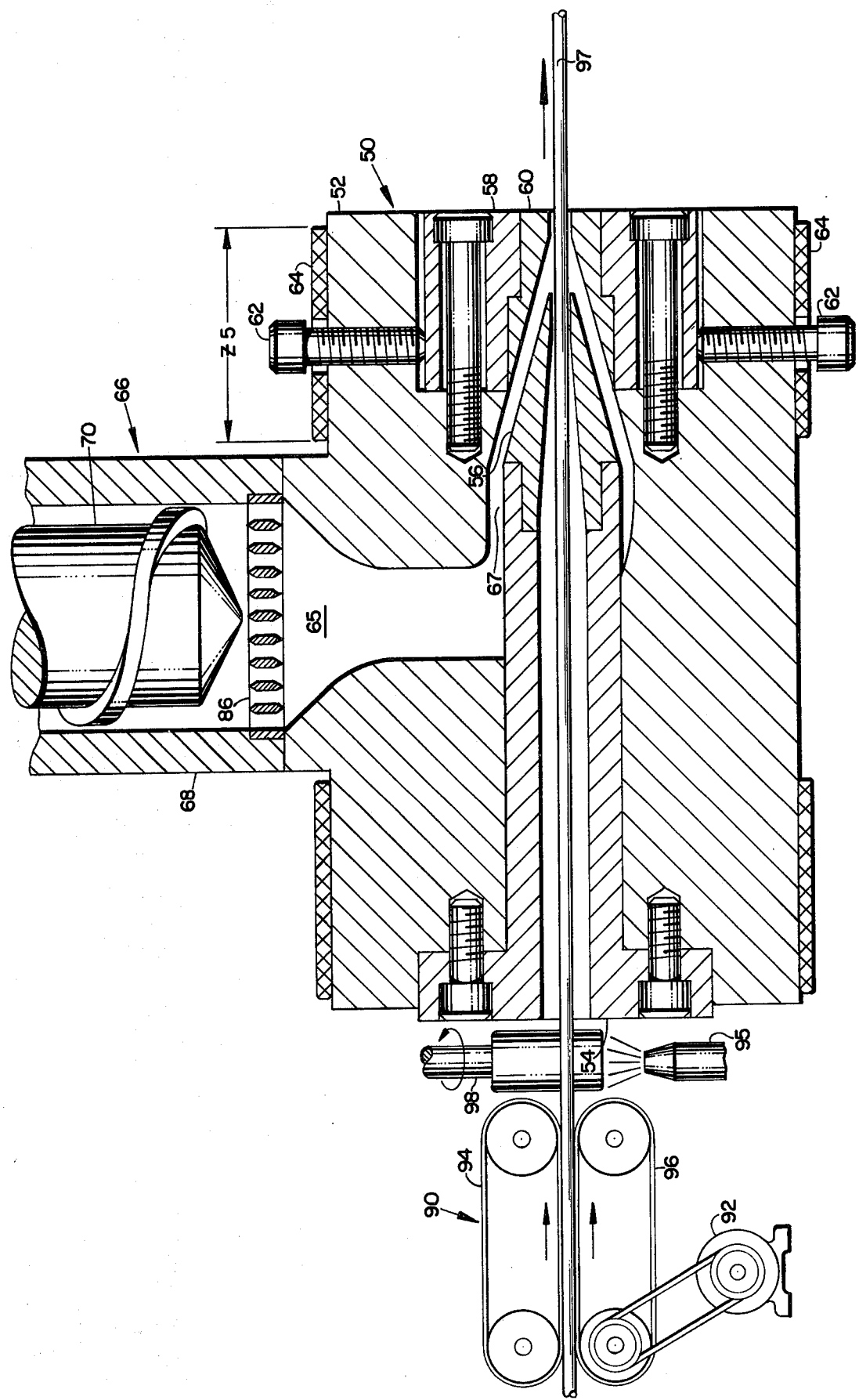
FIG. 2 is a schematic cross-section of a crosshead extrusion die which may be used in practicing a step of the invention.

One preferred method of the invention for manufacturing a film advancing and fluid spreading roller having the characteristics as described above may best be understood with reference to FIGS. 2 and 3.

Shown schematically in FIG. 2 is a cross-head extrusion die 50 of the type which is used to carry out a step in the method of the invention. The extrusion die 50 comprises a barrel body member 52 which serves to support its various parts. Centrally located within the barrel body 52 is a mandrel 54 having a guider tip 56 affixed to one of its ends. The mandrel 54 in combination with guider tip 56 serve to support and guide the workpiece, designated at 97, as it passes through the extrusion die 50.

Located in the forward end of the barrel body 52 is a die holder 58 in which is disposed a cross-head forming die 60. Passing through the barrel body 52 and engaging the surface of the die holder 58 are a pair of adjustment screws 62 which are used to adjust the location of the forming die 60 so that it is centered with respect to the guider tip 56. Wrapped around the exterior surface of the barrel body 52, and surrounding the die holder 58 and the forming die 60, is a heater band 64 for maintaining the temperature of the forming die 60 and its surroundings (Z-5) at a predetermined value.

In operation, a melted polymeric material is introduced into an annular cavity 67 which generally surrounds a portion of the mandrel 54 and guiding tip 56 and extends in a tapered fashion toward the forming die 60. The melted polymeric material is introduced into the cavity 67 by way of an inlet throat 65 which receives the melted polymeric material from a screw extruder 66 (see FIG. 3).

As shown schematically in FIG. 3, the screw extruder 66 comprises a hollow cylindrical barrel 68 in which is disposed a screw 70. Raw plastomeric material, preferably in the form of pellets, is deposited in a gravity feed hopper 72 from which it descends into the barrel 68 via a feed throat 74. The screw 70, when rotated, advances material from the feed throat 74 of the barrel 68 toward its opposite end, the discharge end, which is connected to the inlet throat 65 of the crosshead die 50.

The screw 70 is rotated in a controlled manner by a motor 76 via a gear reducer 78, a flexible coupling 80, and a thrust bearing 82.

Spaced apart heater bands 84 are provided on the outside surface of the barrel 68 to increase the temperature of the polymeric material as it is advanced along the length of the barrel 68 by the screw 70. The barrel 68 is divided into four zones, Z1, Z2, Z3, and Z4, as indicated in FIG. 3. Each of the four zones is regulated at a different temperature while the polymeric material is being transported across the length of the barrel 66. The temperature in each of the four zones is monitored by a series of thermocouples 88 so that it may be precisely controlled.

Located at the discharge end of the barrel 68 is a screen pack and breaker plate 86 for capturing any of the polymeric material which may not have been melted by the time it reaches the discharge end of the barrel 68.

Referring now to FIG. 2 again, there is shown schematically a feed machine 90 comprising a pair of rotatably mounted flexible endless belts 94 and 96, and a pair of rollers 98 only one of which is shown. The belt 96 is driven by a motor 92 whose rate of rotation may be controlled in a well-known manner. With this feed machine arrangement, it is thus possible to control the rate at which the workpiece 97 passes through the crosshead extrusion die 50.

Having described apparatus which is suitable for use in practicing certain steps of the methods of the present invention, the steps of one preferred method of the invention will now be described.

The workpiece 97 in the form of a length of cylindrical metal rod of predetermined diameter is introduced into the feed machine 90 as illustrated schematically in FIG. 2. The speed of the feed machine 90 is regulated so that the rod 97 advances at a predetermined rate of speed. Immediately after the rod 97 begins to leave the feed machine 90, it is heated to a predetermined temperature preferably by using an induction type heater (not shown). After the cylindrical rod 97 has been heated, an adhesive composition is applied to its exterior surface prior to its entering the cross-head extrusion die 50. The purpose of the adhesive composition is to promote bonding between the metal rod and a polymer which will be extruded onto the surface of the cylindrical rod 97 as it passes through the cross-head extrusion die 50. Heating the rod 97 before applying the adhesive composition accelerates drying of the adhesive composition. The adhesive composition may be applied to the outside surface of the cylindrical rod stock 97 in a well-known manner such as by spraying with a nozzle indicated schematically at 95 in FIG. 2.

Once the cylindrical rod stock 97 has been introduced into the rear of the cross-head die 50, it passes through the mandrel 54 and the guider tip 56. The melted polymer is then extruded around the cylindrical rod 97 as it emerges from the guider tip 56 and passes through the forming die 60.

After emerging from the cross-head extrusion die 50, the coated rod 97 is then subjected to a predetermined temperature to harden the coating applied by the extrusion step.

Once the coating has hardened, the cylindrical rod 97 is then cut into a plurality of segments each of which has a predetermined length preferably equal to the overall length of the final roller.

The individual rod segments are then machined to provide them with journals at their opposite ends and to reduce the thickness of the coating intermediate the journals to provide a film-contacting traction coating of predetermined thickness and smoothness. The preferred method of machining the individual rod segments is to centerless grind them. By using well-known centerless grinding techniques both the journals and the coating applied during the extrusion process may be simultaneously machined to provide the appropriate dimensions required for the final roller.

The preferred apparatus, materials, and processing conditions which have been found successful in carrying out the above method of this invention for manufacturing film-advancing and fluid-spreading roller possessing the characteristics previously described are as follows.

The cross-head extrusion die was a model BH-75-1 centering cross-head die manufactured by B and H Tool Co., Inc., Bridgeport, Conn. The single screw extruder was a Model 2523 Brabender, ¾ inch barrel diameter bore equipped with a 1.5/1 compression ratio screw, both manufactured by C. W. Brabender Instruments, Inc., South Hackensack, N.J.

The adhesive composition with which the stainless steel rod was primed prior to having the polymeric coating extruded onto its outside surface preferably comprises a dispersion of carbon black in a two- or preferably three-part adhesive system.

One component of the adhesive system consists of a metal adhesive particularly selected for its adherence to steel and comprising an acrylic polymer containing amine groups. The amine functional groups react with the metal surface to promote adhesion. A second constituent of the adhesive system consists of a hydroxylated vinyl resin, in which the hydroxyl groups aid in metal bonding, and in which the vinyl constituents promote adhesion to the polymeric coating and aid in the dispersion of the carbon in the adhesive system. A third constituent is preferably included which comprises a vinyl resin that is primarily selected for its compatibility with a resin constituent of the polymeric coating, and at the same time for its promotion of carbon dispersion in the adhesive system. The above adhesive system is preferably made as a dispersion of carbon black in a solution of the adhesive components in an organic solvent. The coating dispersion is preferably thinly applied to the surface of the steel to which the polymeric material is to be bonded as previously described. By induction heating the rod 97 prior to the application of the adhesive composition, drying of the adhesive composition is accelerated by evaporation of the organic solvent as previously described. However, it is preferred that the adhesive composition be substantially dried to a thickness of preferably 0.15±0.05 mils before extruding. An adhesive composition possessing the characteristics and constituents described above is described in more detail in U.S. Pat. application Ser. No. 742,837 filed on Nov. 18, 1976 in common assignment herewith by Neal F. Kelly and entitled "Conductive Laminate and Method and Composition for Making the Same".

The preferred polymeric material is an elastomeric urethane resin which may be processed as a thermoplastic. In particular, the urethane resin which has been most successful is Texin ® 480F manufactured by the MOBAY Chemical Corporation, Plastics and Coating Division, Pittsburgh, Pa. This particular material has a melting temperature of 177°–188° C. and a Shore Hardness "A" scale value of 86±3 as measured according to ASTM Test Method D2240.

The temperature settings for the various zones surrounding the barrel 66 and the forming dye 60 and its surrounds are specified in Table 1 below.

| Zone | Temperature (°C.) |
|---|---|
| 1 | 210 |
| 2 | 220 |
| 3 | 240 |
| 4 | 240 |
| 5 | 230 |

One feed rate suitable for advancing the rod 97 through the cross-head extrusion die 50 is 4 feet per minute.

With the foregoing apparatus and processing conditions, the volume rate of flow of the melted urethane resin was approximately 0.96 cubic inches per minute, and it was possible to maintain the thickness of the coating applied to the exterior of the stainless steel rod between the preferred limits of 9.0 and 10.0 mils. In this regard, it has been found important for centerless grinding operations that the extruded coating thickness should be no less than 9 mils and no more than 10 mils if the desired final thickness of the coating is to be achieved and if the surface smoothness characteristics are to be held within the limits already specified.

The method is most economical when the length of the rod 97 is chosen so that, when cut, it yields a whole number of processing rollers.

Figure 5:
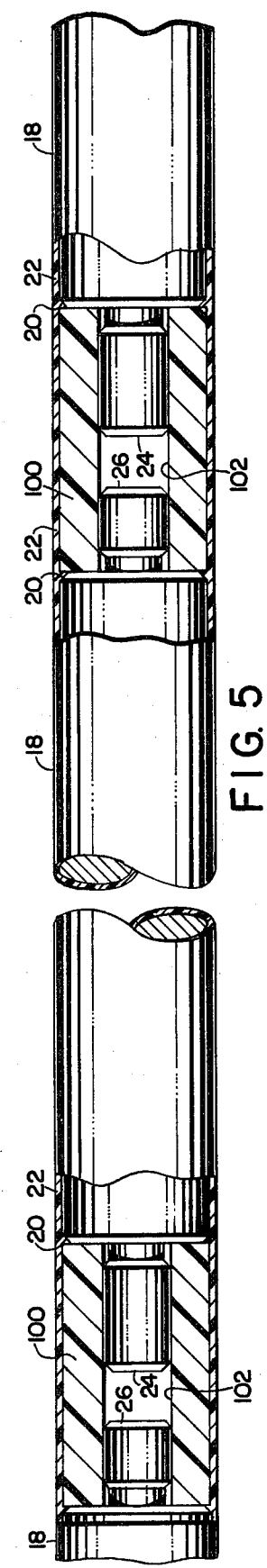
FIG. 5 is a diagrammatic, partially cut-away, front elevation view illustrating a continuous chain of coupled roller segments coated according to one of the disclosed methods of the invention.

Another method of the invention which also utilizes the previously described apparatus may be understood with reference now to FIG. 5. With this second method, the metal rod 97 is first cut into a plurality of segments of given length. Journals are then machined at the opposite ends of the rod segments. The individual rod segments are then connected together end to end by inserting their journals into couplings designated at 100 in FIG. 5 to form a continuous chain of rod segments. The continuous chain of rod segments thus formed is then fed into the feed machine 90 which pushes them through the cross-head extrusion die 50 in substantially the same way as the solid rod 97 was pushed through it. As before, the continuous chain of rod segments is heated and then coated with the adhesive composition as previously described. After the rod segments have been coated they are, as before, subjected to a temperature below the melting temperature of the polymer to harden the coating. Following hardening of the extruded coating, the coated rod segments are then separated from the couplings 100, and the couplings 100 are discarded. The coating of each roller segment is then ground to reduce its thickness intermediate its journals to provide a film-contacting traction coating of predetermined thickness and smoothness and to remove any excess material which may be left at the ends of the roller segments after they have been removed from the couplings 100.

The couplings 100 are cylinders having a straight-through hole 102 which is dimensioned to receive the journals 24 and 26 as shown in FIG. 5. The couplings 100 are preferably formed of a plastic thermoset material which will not melt during either the induction heating step or the extrusion step. Also the diameters of the couplings should be chosen so that they are equal to or less than the outside diameter of the stainless steel rod.

The preferred process conditions, apparatus, and materials for this second method are the same as those of the previously described method. This second method also results in considerable per unit cost savings but will be somewhat more expensive than the previous method because of the added cost of the couplings 100.

Certain changes may be made in the above-described methods without departing from the scope of the invention and those skilled in the art may make such changes according to the teachings of this disclosure. For example, it is obvious that the materials used in the present invention are not the only ones which may be used to manufacture photographic processing rollers of the type discussed. Therefore, it is intended that all matter contained in the above description or shown in the accompanying drawings shall be interpreted as illustrative and not in the limiting sense.

What is claimed is:

1. A method for manufacturing photographic film processing rollers each having a given length comprising the steps of:
   heating a cylindrical metal rod having a length greater than a plurality of said given lengths of said processing rollers;
   applying an adhesive composition to the surface of the heated cylindrical rod whereby drying of the adhesive composition is promoted by the heat contained in the rod, said adhesive composition operating the promote bonding between the surface of the metal rod and a polymer;
   extruding a melted polymer onto the surface of the metal rod to provide the surface of the rod with a thin polymeric coating whose coefficient of friction is greater than that of the metal rod;
   subjecting the coated rod to a predetermined temperature to harden the coating;
   cutting the coated rod into a plurality of segments each having a length at least equal to said given length of said processing roller; and
   machining each rod segment to provide its opposite ends with journals each having a maximum diameter less than the diameter of the rod for facilitating its mounting for rotation in a film processing apparatus and to reduce its coating thickness intermediate its journals to provide a film contacting traction coating of predetermined thickness and smoothness.

2. A method for manufacturing photographic film processing rollers each having a given length comprising the steps of:
   applying an adhesive composition to the surface of a cylindrical metal rod having a length greater than a plurality of said given lengths of said processing rollers to promote bonding between the surface of the metal rod and a polymer;
   substantially drying the adhesive composition;
   extruding a melted polymer onto the surface of the cylindrical metal rod to provide the surface of the rod with a thin polymeric coating whose coefficient of friction is greater than that of the metal rod;
   subjecting the coated rod to a predetermined temperature to harden the coating;
   cutting the coated rod into a plurality of segments each having a length at least equal to said given length of said processing roller; and
   machining each rod segment to provide its opposite ends with journals each having a maximum diameter less than the diameter of the rod for facilitating its mounting for rotation in a film processing apparatus and to reduce its coating thickness intermediate its journals to provide a film-contacting traction coating of predetermined thickness and smoothness,
   said method steps recited above wherein the polymer comprises an elastomeric urethane resin, and wherein the adhesive composition comprises a dispersion of carbon black in an adhesive matrix comprising a first polymeric resin containing functional groups reactive with the metal rod and a second polymeric resin chemically similar to a polymeric constituent of the urethane resin, and wherein the thickness of the substantially dried adhesive composition is 0.15±0.05 mils, the thickness of the machined film-contacting traction coating is no less than 5.0 mils and no greater than 7.0 mils.

3. A method for manufacturing photographic film processing rollers each having a given length comprising the steps of:
   cutting a cylindrical metal rod having a length greater than a plurality of said given length of said processing rollers into a plurality of segments each having a length at least equal to said given length of said processing rollers;
   machining each rod segment to provide its opposite ends with journals having maximum diameters less than the
   diameter of the rod to facilitate its mounting for rotation within a film processing apparatus, the journals each having a predetermined length so that the distance between the journals generally defines the width of a film-contacting surface;
   connecting the rod segments together end to end by inserting their journals into couplings to form a continuous chain of rod segments;
   heating each rod segment in preparation for applying an adhesive composition to its surface to promote drying of the adhesive composition;
   applying an adhesive composition to the surface of each rod segment to promote bonding between the metal surface of each rod segment and a polymer;
   pushing the continuous chain of rod segments through an extrusion die to deposit a melted polymer on the surface of each rod segment to provide the segment's surface with a thin polymeric coating whose coefficient of friction is greater than that of the metal;

subjecting the coated rod segments to a predetermined temperature to harden the polymeric coating;

separating the coated rod segments from the couplings; and machining the coating of each rod segment to reduce its thickness intermediate its journals to provide a film-contacting traction coating of predetermined thickness and smoothness.

4. A method for manufacturing photographic film processing rollers each having a given length comprising the steps of:

cutting a cylindrical metal rod having a length greater than a plurality of said given length of said processing rollers into a plurality of segments each having a length at least equal to said given length of said processing rollers;

machining each rod segment to provide its opposite ends with journals having maximum diameters less than the diameter of the rod to facilitate its mounting for rotation within a film processing apparatus, the journals each having a predetermined length so that the distance between the journals generally defines the width of a film-contacting surface;

connecting the rod segments together end to end by inserting their journals into couplings to form a continuous chain of rod segments;

applying an adhesive composition to the surface of each rod segment to promote bonding between the metal surface of each rod segment and a polymer;

substantially drying the adhesive composition;

pushing the continuous chain of rod segments through an extrusion die to deposit a melted polymer on the surface of each rod segment to provide each segment's surface with a thin polymeric coating whose coefficient of friction is greater than that of the metal;

subjecting the coated rod segments to a predetermined temperature to harden the polymeric coating;

separating the coated rod segments from the couplings; and machining the coating of each rod segment to reduce its thickness intermediate its journals to provide a film-contacting traction coating of predetermined thickness and smoothness.

5. The method of claim 4 wherein the polymer comprises an elastomeric urethane resin, and wherein the adhesive composition comprises a dispersion of carbon black in an adhesive matrix comprising a first polymeric resin containing functional groups reactive with the metal rod and a second polymeric resin chemically similar to a polymeric constituent of the urethane resin, and wherein the thickness of the substantially dried adhesive composition is 0.15±0.05 mils, the thickness of the extruded polymeric coating is no less than 9.0 mils and no greater than 10.0 mils, and the thickness of the machined film-contacting traction coating is no less than 5.0 mils and no greater than 7.0 mils.

6. A method for manufacturing photographic film processing rollers each having a given length comprising the steps of:

applying an adhesive composition to the surface of a cylindrical stainless steel rod having a length greater than a plurality of said given lengths of said processing rollers to promote bonding between the surface of the stainless steel rod and a polymer;

cross-head extruding a melted polymer comprising an elastomeric urethane resin onto the adhesive surface formed on the stainless steel rod to provide the rod with a thin polymeric coating whose coefficient of friction is greater than that of the stainless steel;

subjecting the coated rod to a predetermined temperature to harden the polymeric coating;

cutting the coated rod into a plurality of segments each having a length at least equal to said given length of said processing roller; and centerless grinding each rod segment to provide its opposite ends with journals each having a maximum diameter less than the diameter of the rod for facilitating its mounting for rotation in a film processing apparatus and to reduce the thickness of the polymeric coating intermediate its journals to provide a film-contacting traction coating of predetermined thickness and smoothness, the method steps recited above wherein the adhesive composition comprises a dispersion of carbon black in an adhesive matrix comprising a first polymeric resin containing functional groups reactive within the stainless steel rod and a second polymeric resin chemically similar to a polymeric constituent of the urethane resin and having a thickness when substantially dried of 0.15±0.05 mils, wherein the thickness of the extruded urethane resin coating is no less than 9.0 mils. and no greater than 10.0 mils, and wherein the thickness of the centerless ground film-contacting traction coating is no less than 5.0 mils and no greater than 7.0 mils.

7. A method for manufacturing photographic film processing rollers each having a given length comprising the steps of:

cutting a cylindrical stainless steel rod having a length greater than a plurality of said given length of said processing rollers into a plurality of segments each having a length at least equal to said given length of said processing rollers;

machining each rod segment to provide its opposite ends with journals having maximum diameters less than the diameter of the rod to facilitate mounting the rod for rotation in a film processing apparatus, the journals each having a predetermined length so that the distance between the journals generally defines the width of a film-contacting surface;

connecting the rod segments together end to end by inserting their journals into couplings to form a continuous chain of rod segments;

applying an adhesive composition to the surface of each rod segment to promote bonding between the stainless steel surface of each rod segment and a polymer;

pushing the continuous chain of rod segments through a cross-head extrusion die to deposit a melted polymer comprising an elastomeric urethane resin on the adhesive composition covering the surface of each rod segment to provide the segment's surface with a thin polymeric coating whose coefficient of friction is greater than that of the stainless steel;

subjecting the coated rod segments to a predetermined temperature to harden the polymeric coating;

separating the coated rod segments from the couplings; and centerless grinding the coating of each rod segment to reduce its thickness intermediate its journals to provide a film-contacting traction coating of predetermined thickness and smoothness, the method steps recited above wherein the adhesive composition comprises a dispersion of carbon black in an adhesive matrix comprising a first polymeric resin containing functional groups reactive with stainless steel and a second polymer resin chemically similar to a polymeric constituent of the urethane resin and having a thickness when substantially dried of 0.15±0.05 mils, wherein the thickness of the extruded polymeric coating is no less than 9.0 mils and no greater than 10.0 mils, and wherein the thickness of the centerless ground film-contacting traction coating is no less than 5.0 mils and no greater than 7.0 mils.

* * * * *